(12) United States Patent
Gonzalez Martin et al.

(10) Patent No.: US 11,813,797 B2
(45) Date of Patent: Nov. 14, 2023

(54) VALIDATING OBJECT MODEL DATA FOR ADDITIVE MANUFACTURING

(71) Applicant: Hewlett-Packard Development Company, L.P., Spring, TX (US)

(72) Inventors: Sergio Gonzalez Martin, Sant Cugat del Valles (ES); Jordi Roca Vila, Sant Cugat del Valles (ES); Manuel Freire Garcia, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 476 days.

(21) Appl. No.: 17/052,106

(22) PCT Filed: Oct. 8, 2018

(86) PCT No.: PCT/US2018/054852
§ 371 (c)(1),
(2) Date: Oct. 30, 2020

(87) PCT Pub. No.: WO2020/076285
PCT Pub. Date: Apr. 16, 2020

(65) Prior Publication Data
US 2021/0053292 A1 Feb. 25, 2021

(51) Int. Cl.
*B29C 64/393* (2017.01)
*B33Y 50/00* (2015.01)
(Continued)

(52) U.S. Cl.
CPC ............ *B29C 64/393* (2017.08); *B22F 10/80* (2021.01); *B29C 64/386* (2017.08); *B33Y 50/00* (2014.12);
(Continued)

(58) Field of Classification Search
CPC ...... B29C 64/393; B29C 64/386; B33Y 50/00; G06F 30/20; B22F 10/80
(Continued)

(56) References Cited

U.S. PATENT DOCUMENTS

| 6,898,477 B2 * | 5/2005 | Loughran | ............... B33Y 50/00 264/401 |
| 8,801,418 B2 * | 8/2014 | El-Siblani | ............... B33Y 10/00 425/375 |

(Continued)

FOREIGN PATENT DOCUMENTS

| WO | WO2018199877 | 11/2018 | |
| WO | WO-2020076285 A1 * | 4/2020 | ........... B29C 64/386 |

OTHER PUBLICATIONS

Huang et al. (Statistical Predictive Modeling and Compensation of Geometric Deviations of Three-Dimensional Printed Products, 2014, ASME) (Year: 2014).*

*Primary Examiner* — Iftekhar A Khan
(74) *Attorney, Agent, or Firm* — Michael Dryja

(57) ABSTRACT

In an example, mesh model data representing at least a portion of a print job to be generated by an additive manufacturing apparatus by solidifying build material is received at a processor. Using a processor and based on the mesh model data, it is validated whether the three-dimensional print job described by the mesh model data conforms with at least one of material-dependent shape constraints and apparatus-dependent shape constraints of the additive manufacturing apparatus. If the result of the validation is positive, the mesh model data is rendered, using a processor for manufacturing the three-dimensional print job by an additive manufacturing apparatus. If the result of the validation is negative, a predetermined action is performed.

17 Claims, 2 Drawing Sheets

(51) Int. Cl.
*B29C 64/386* (2017.01)
*G06F 30/20* (2020.01)
*B22F 10/00* (2021.01)
*B22F 10/28* (2021.01)
*B22F 10/38* (2021.01)
*B22F 10/80* (2021.01)

(52) U.S. Cl.
CPC ............. *G06F 30/20* (2020.01); *B22F 10/28* (2021.01); *B22F 10/38* (2021.01)

(58) Field of Classification Search
USPC ............................................................ 703/7
See application file for complete search history.

(56) References Cited

U.S. PATENT DOCUMENTS

| | | | | |
|---|---|---|---|---|
| 9,724,876 | B2* | 8/2017 | Cheverton | B29C 64/393 |
| 9,855,698 | B2* | 1/2018 | Perez | B29C 48/266 |
| 9,999,924 | B2* | 6/2018 | Dave | B33Y 10/00 |
| 10,839,598 | B2* | 11/2020 | Zeng | B29C 64/386 |
| 10,891,786 | B2* | 1/2021 | Zeng | G05B 19/408 |
| 11,043,042 | B2* | 6/2021 | Del Angel | G06T 19/20 |
| 2011/0087350 | A1* | 4/2011 | Fogel | G06T 19/00 700/98 |
| 2011/0231162 | A1* | 9/2011 | Ramamurthi | A61B 6/5247 703/2 |
| 2011/0293771 | A1* | 12/2011 | Oberhofer | B29C 64/364 425/182 |
| 2012/0065755 | A1* | 3/2012 | Steingart | B33Y 30/00 700/98 |
| 2012/0239359 | A1* | 9/2012 | Furuya | G06F 30/23 703/2 |
| 2014/0257547 | A1* | 9/2014 | Bachrach | G06Q 10/04 700/118 |
| 2014/0268604 | A1* | 9/2014 | Wicker | B29C 70/82 264/445 |
| 2015/0193559 | A1* | 7/2015 | Musuvathy | G06F 30/17 703/1 |
| 2015/0321427 | A1* | 11/2015 | Gunnarsson | G05B 19/4099 700/98 |
| 2017/0050382 | A1 | 2/2017 | Minardi et al. | |
| 2017/0061036 | A1* | 3/2017 | Schmidt | G06F 30/20 |
| 2017/0113414 | A1* | 4/2017 | Zeng | B33Y 30/00 |
| 2017/0129179 | A1* | 5/2017 | Mandel | B29C 64/314 |
| 2017/0193699 | A1* | 7/2017 | Mehr | G06T 17/205 |
| 2017/0246812 | A1* | 8/2017 | Morovic | G05B 19/4099 |
| 2017/0329878 | A1* | 11/2017 | Gondek | G06T 17/005 |
| 2017/0372513 | A1* | 12/2017 | Zeng | G06T 17/00 |
| 2018/0001567 | A1* | 1/2018 | Juan | B29C 64/259 |
| 2018/0117850 | A1 | 5/2018 | Schwaartz et al. | |
| 2018/0147783 | A1* | 5/2018 | Bheda | B29C 64/386 |
| 2019/0095555 | A1* | 3/2019 | Lopez | G06F 30/17 |
| 2019/0134914 | A1* | 5/2019 | Gonzalez | G06F 30/20 |
| 2019/0146457 | A1* | 5/2019 | Komzsik | B33Y 50/00 700/118 |
| 2019/0152155 | A1* | 5/2019 | Gonzalez | B29C 64/386 |
| 2020/0298495 | A1* | 9/2020 | Manousakis | G06Q 10/08 |
| 2021/0080930 | A1* | 3/2021 | Hamaguchi | B22F 10/85 |
| 2021/0124333 | A1* | 4/2021 | Gonzalez | G06T 19/00 |
| 2021/0200185 | A1* | 7/2021 | Shepherd | G05B 19/4099 |
| 2021/0208573 | A1* | 7/2021 | Gonzalez | G06F 40/20 |
| 2021/0283850 | A1* | 9/2021 | Zeng | B33Y 50/00 |
| 2021/0294941 | A1* | 9/2021 | Muntal Diaz | G06F 30/10 |
| 2021/0362427 | A1* | 11/2021 | Gonzalez Martin | B33Y 50/02 |
| 2022/0009171 | A1* | 1/2022 | Muntal Diaz | G05B 19/4099 |

\* cited by examiner

VALIDATING OBJECT MODEL DATA FOR ADDITIVE MANUFACTURING

BACKGROUND

Additive manufacturing systems generate three-dimensional objects on a layer-by-layer basis to produce three-dimensional objects. In examples of such techniques, build material may be supplied in a layer-wise manner and the solidification method includes heating the layers of build material to cause melting in selected regions.

BRIEF DESCRIPTION OF DRAWINGS

Examples will now be described, by way of non-limiting example, with reference to the accompanying drawings, in which.

DETAILED DESCRIPTION

Figure 1:
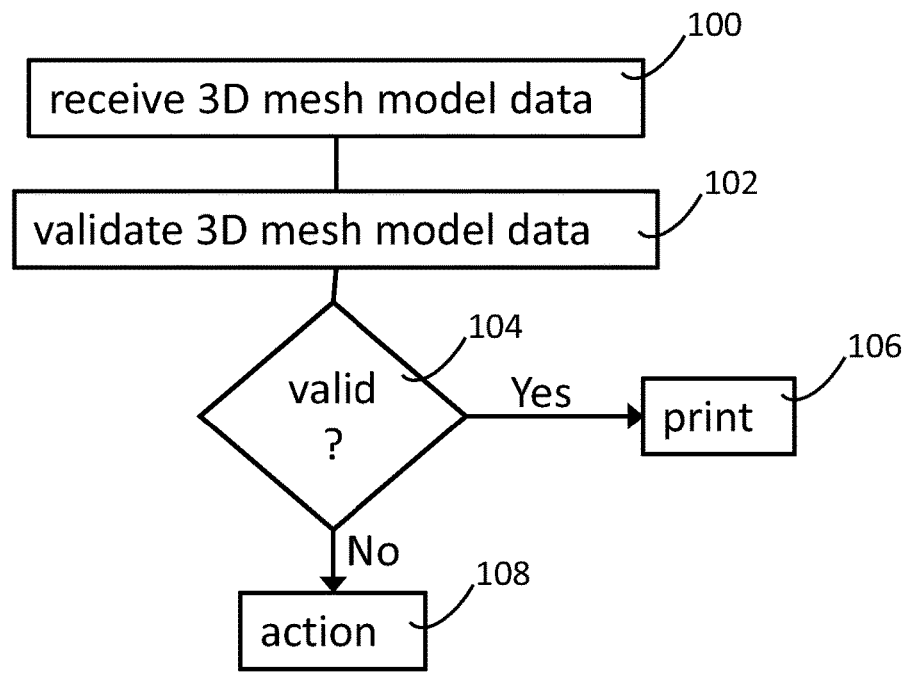
FIG. 1 shows a flowchart of a validation method according to one example.

Additive manufacturing techniques may generate a three-dimensional object through the solidification of a build material. In some examples, the build material is a powder-like granular material, which may for example be a plastic, ceramic or metal powder and the properties of generated objects may depend on the type of build material and the type of solidification mechanism used. Build material may be deposited, for example on a print bed and processed layer by layer, for example within a fabrication chamber. According to one example, a suitable build material may be PA12 build material commercially known as V1R10A "HP PA12" available from HP Inc.

In some examples, selective solidification is achieved through directional application of energy, for example using a laser or electron beam which results in solidification of build material where the directional energy is applied. In other examples, at least one print agent may be selectively applied to the build material, and may be liquid when applied. For example, a fusing agent (also termed a 'coalescence agent' or 'coalescing agent') may be selectively distributed onto portions of a layer of build material in a pattern derived from data representing a slice of a three-dimensional object to be generated (which may for example be generated from structural design data). The fusing agent may have a composition which absorbs energy such that, when energy (for example, heat) is applied to the layer, the build material to which fusing agent has been applied heats up/melts, coalesces and then solidifies to form a slice of the three-dimensional object in accordance with the pattern. In other examples, coalescence may be achieved in some other manner.

In an example, a suitable fusing agent may be an ink-type formulation comprising carbon black, such as, for example, the fusing agent formulation commercially known as V1Q60A "HP fusing agent" available from HP Inc. In some examples, a fusing agent may comprise at least one of an infra-red light absorber, a near infra-red light absorber, a visible light absorber and a UV light absorber. Examples of print agents comprising visible light enhancers are dye based colored ink and pigment based colored ink, such as inks commercially known as CE039A and CE042A available from HP Inc.

In addition to a fusing agent, in some examples, a print agent may comprise a detailing agent, or coalescence modifier agent, which acts to modify the effects of a fusing agent for example by reducing (e.g. by cooling) or increasing coalescence or to assist in producing a particular finish or appearance to an object. Detailing agent may also be used to control thermal aspects of a layer of build material—e.g. to provide cooling. In some examples, detailing agent may be used near edge surfaces of an object being printed. According to one example, a suitable detailing agent may be a formulation commercially known as V1Q61A "HP detailing agent" available from HP Inc. A coloring agent, for example comprising a dye or colorant, may in some examples be used as a fusing agent or a coalescence modifier agent, and/or as a print agent to provide a particular color for the object. Print agents may control or influence other physical or appearance properties, such as strength, resilience, conductivity, transparency, surface texture or the like.

As noted above, additive manufacturing systems may generate objects based on structural design data. This may involve a designer generating a three-dimensional model of an object to be generated, for example using a computer aided design (CAD) application. The model may define the solid portions of the object. To generate a three-dimensional object from the model using an additive manufacturing system, the model data can be processed to generate slices defined between parallel planes of the model. Each slice may define a portion of a respective layer of build material that is to be solidified or caused to coalesce by the additive manufacturing system.

During the print process, there are certain aspects of the job composition which may impact part quality. In particular, part quality problems may be caused by thermal non-uniformities across a build bed of the additive manufacturing system. An addictive manufacturing apparatus may, for example, comprise a preheating lamp which provides heat to the whole build bed, as well as an additional fusing lamp which is provided on a carriage and heats the area underneath the carriage.

Depending on the print job being generated and on the thermal conductance, reflectivity and fusing properties of the build material and the fusing agent, the way that the build material fuses may differ, which may then cause inconsistent material or surface properties in different portions of the manufactured item. As an example, if there is a big area of non-fused powder in the build bed, the surrounding portions may over-fuse due to energy from the fusing lamp being reflected back to the objects, especially if a white powder with a high reflectivity is used. As a further example, if two separate objects are placed very close to each other, their interaction may cause heat interchange between respective portions of the objects in a layer as the respective portions of the objects are fused by the fusing lamp, impacting thus the quality of the resulting objects.

The method of FIG. 1 illustrates an example of a validation method. Therein, at block 100, 3D mesh model data representing at least a portion of a print job to be generated by an additive manufacturing apparatus by fusing build material is received at a processor. The mesh model may e.g. be a triangular mesh model or a model representing a 3D item as stacks of polygonal slices. It is also noted that a print job may comprise a collection or an assembly of multiple separate objects which are to be manufactured in a single build unit.

For the purpose of the present disclosure, a print job may comprise multiple separate objects which may be defined as separate mesh models. The objects of a single print job may be independent of each other and may be arranged in a defined spatial relationship to each other in an area corresponding to the printer's build bed, such as e.g. an array of identical gears which are to be printed within a single build unit. Alternatively, the objects may form an assembly that is to be printed as a readily assembled multi-part device wherein the respective positions of the objects in the assembly correspond to the respective positions of the component parts in the assembled device, such as e.g. three-part scissors comprising two blades and a joining member which are printed as a readily-assembled device.

At block 102, the received 3D mesh model data of the print job is validated using a processor. During the validation, it is determined whether the print job described by the mesh model data conforms with at least one of material-dependent shape constraints and apparatus-dependent shape constraints of the additive manufacturing apparatus. Some examples of these constraints will be described below in greater detail and may be related e.g. to minimum distances between objects, isolated volumes per object, or object density distributions. It may be noted that these constraints are specified to be material-dependent shape constraints and apparatus-dependent shape constraints.

In particular, material-dependent shape constraints may comprise minimum distances between objects based on energy absorption and energy reflection properties of build material and fusing agents. Apparatus-dependent shape constraints may be related to the positioning and output properties of preheating lamps or fuse lamps of a given additive manufacturing apparatus, and the resulting energy distribution over the area of a build bed. A further apparatus-dependent shape constraint may be related to the definition of multiple separate, isolated volumes in a single print job. If multiple separate volumes are defined as a single object of the print job, part quality issues may occur since, for example, a situation may occur wherein not all outer surfaces of the separate volumes are correctly identified as outer surfaces of the object, so that a detailing agent may be applied to only a portion of the outer surfaces of the separate volumes. If separate volumes are positioned too close to each other, heat energy may be transferred between the separate volumes, leading to over-fusing of the respective areas. This may be an issue specific of the printer technology and may depend, for example, on power values of a specific printer's preheating lamps and fusing lamps, relative positioning of lamps and build beds or the like. Each of these shape constraints may result in specific limitations regarding the shapes that can be manufactured at a high part quality by a specific additive manufacturing apparatus, using specific build material and fusing agents. Attempting to manufacture a print job which violates the material-dependent or apparatus-dependent shape constraints may lead to reduced part quality and may thus lead to a waste of printing resources if low quality objects have to be discarded after printing.

In addition, in some examples, other validation procedures may be carried out, for example checking for any or any combination of an isolated polygon or vertex, an empty or negative mesh volume, a hole in the mesh (where the mesh is not 'watertight', which may mean detecting holes of at least a threshold size as smaller holes may 'close up' on object generation), inconsistent polygon orientation, overlapping polygons, duplicated polygons or vertices, zero area polygons, non-manifold vertices or edges, and mesh intersections. Such validation procedures may for example check that model data conforms with a 3D manufacture format file (3MF) specification.

At block 104, the result of the validation processing is examined in order to determine if the 3D object model data describes a valid object for printing with a specific additive manufacturing apparatus, which may have e.g. been specified in advance. If the 3D object model data is found to be valid ("Yes" in block 104), the validated object mesh model data is rendered using a processor and may subsequently be sent to an additive manufacturing apparatus for printing at block 106. If the 3D object model data is found not to be valid ("No" in block 104), a predetermined action is performed at block 108.

Such a predetermined action could e.g. comprise providing a warning to a user, for example by issuing a warning message, so that a user can examine the 3D object model data and amend potentially problematic portions. According to an example, the predetermined action could comprise a corrective action, wherein e.g. objects which are found to be positioned too closely together are re-positioned with a predetermined minimum distance from each other without the need for user input. As a combination of these approaches, the predetermined action could provide a suggested corrective measure and inform the user thereof, leaving it to the user to amend the job to ensure an intended part quality.

Since the validation can be performed on object mesh model data before rendering or voxelization, the validation and feedback can be provided at an early stage in the print process, thus providing a computationally effective way for ensuring part quality without producing rendered data or printed objects that later need to be discarded.

Figure 2:
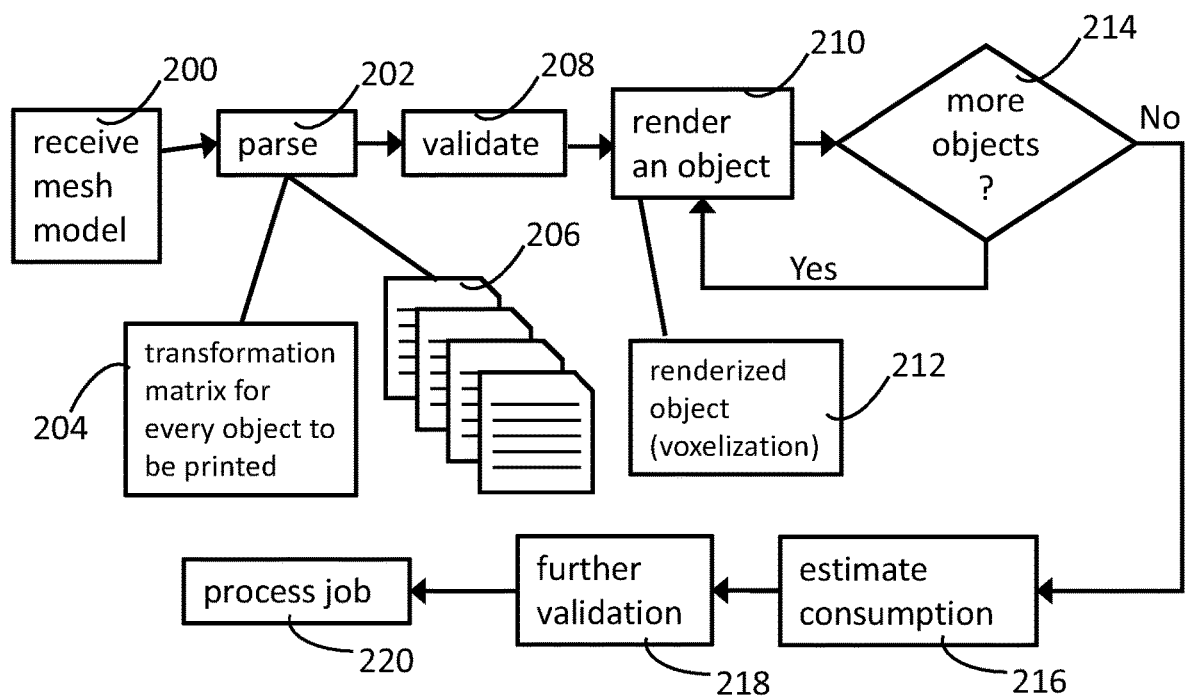
FIG. 2 is a flowchart of an example of a method for generating a three-dimensional object using an additive manufacturing system.

FIG. 2 shows a schematic view of an example of an additive manufacturing process wherein the validation method as described above may be implemented. In block 200 of the example additive manufacturing process, mesh model data defining a print job that is to be manufactured is supplied. From the received mesh model data, a pre-print processing block 202 parses the received data to generate a 3MF file which describes the content to be printed as a collection of 3D objects (which may e.g. be triangle meshes or stacks of polygonal slices) which are positioned in printable positions relative to the printer's build bed. Therein, a transformation matrix 204 for each object to be printed may be generated, as well as at least one intermediate file 206 storing the 3D geometry for each object of the multi-part 3D object.

The 3MF file created in block 202 may then be subject to a validation processing 208 as described above in conjunction with FIG. 1, wherein the intermediate files 206 may be validated in view of material-dependent or apparatus-dependent shape constraints.

Subsequently, according to the example additive manufacturing process, each validated intermediate file 206 is received by an additive manufacturing apparatus, for example, following a HTTP Post request, and is then parsed in block 210 in order to create a volumetrically rendered file 212 which comprises the voxelization of a single object that is to be printed. In block 214, it is determined whether the current print job comprises any further objects that still need to be voxelized/rendered. If this is the case, the process is returned to block 210. Once all the objects have been renderized/voxelized, and a renderized/voxelized file 212 has been generated for all of the objects in the print job, the printing pipeline is executed at a lower resolution (e.g. 150 dpi in the XY plane and 160 microns layer thickness) to obtain a relatively accurate material consumption estimation in block 216.

During or after the consumption estimation block 216, the low-resolution data may be used for additional validation processing in block 218, using an object density shape criterion as will be explained in greater detail below. After that, the job is considered as processed (block 220) and ready to be printed.

In the following passages, a few examples of shape criteria for validation of object mode data are described in detail.

A first example for a shape criterion is a minimum object distance. The object distance can be checked by evaluating the input 3D mesh model data comprising multiple objects as respective mesh models, which could e.g. be formatted as 3MF files. It is noted that the 3D mesh model data can be validated before the content is rendered/voxelized, so that, in the schematic process as shown in FIG. 2, the validation could be performed, for example, after parsing of the 3MF files has finished and all the 3MF models have been extracted in block 202, before the rendering at block 208. Thus, if a printing job is generated by a user wherein the objects are spaced too closely to each other, the job can be directly rejected without the need of performing processing to generate a voxelization which would be discarded later.

When determining whether a received 3D mesh model is valid in terms of minimum object distance, every pair of objects which belong to the 3D object model is iterated and, for every pair of objects, both models are loaded in memory and the closest point between the two meshes is computed. The computation of the minimum distance between two triangular meshes may be carried out, for example using the Hausdorff distance algorithm, or other techniques.

Therein, the criterion for minimum object distance may depend on the specific build material, such as, for example, based on reflectivity and thermal conductivity values of a specific build material, as well as on the absorptivity, reflectivity and thermal conductivity of the fusing agent. If a detailing agent is employed, the minimum object distance may further depend on thermal, optical and mechanical properties of the detailing agent. Additionally, the minimum object distance criterion may be adjusted based on the position, power output and properties of the preheating lamp and the fusing lamp of a given additive manufacturing apparatus.

However, a 3D mesh model may comprise an assembly of objects which are placed closely together in order to create a functional composite device, such as e.g. scissors comprising two blades and a joining member which are printed as an assembled device. In this case, the whole assembly may be treated as a single object when examining a minimum object distance shape criterion. Thus, the validation processing based on the minimum object distance shape criterion considers objects which are defined as separate items in the print job. If an object belongs to an assembly, the validation considers the mesh models from all the objects belonging to the assembly as a single composite object and no minimum object distance is determined between the objects forming an assembly.

However, according to a modified example, minimum object distances may be determined between the objects of an assembly, and a separate message may be issued for informing the user about potential part quality issues of the assembly due to violations of the minimum distance criterion between objects of the assembly. This could enable the user, for example, to rotate objects in an assembly relative to each other, within the constraints imposed by the functional relationship of the objects in the assembly, in order to ensure an intended part quality of the assembled device.

A further example of a shape criterion is a determination of isolated volumes per object. For some applications, it may be convenient to validate that every isolated volume is encoded in a separated object. In this way, coherence with the validation regarding the minimum object distance could be achieved, since, for separate volumes defined as a single object, no minimum distance between the separate volumes would be checked. Similar to the previously described validation criterion, a criterion based on isolated volumes per object may be executed during the parsing stage just after the individual object geometry has been extracted from the 3MF file, i.e. at block 208 in the example additive manufacturing process shown in FIG. 2.

For a determination of isolated volumes per object, the content from the mesh model of an object may be evaluated and it may be determined how many watertight surfaces are found in this model. If more than one volume is found, then a warning may be issued due to the object having more than one volume. The validation based on this shape criterion can be performed e.g. by traversing the list of triangles encoded on the mesh and validating the triangle connectivity. Thus, it can be ensured that, in the 3D mesh model data, each separate volume is encoded as a separate object so that, for example, potential part quality issues due to separate volumes being located too closely together can be identified. If several objects are to be positioned closely together, these could be encoded as an assembly as described above. Issuing a warning message related to the presence of multiple isolated volumes in a single object could encourage a user to either define the isolated volumes as separate objects of an assembly, or to redesign the model in a manner which takes the shape constraints regarding e.g. minimum distance between isolated volumes into account.

A third shape criterion that may be used for an additional validation is an object density distribution. Therein, a density measure is computed for each slice in the rendered data, and it is determined whether a variability of the density measure is smaller than a predetermined threshold. Object generation processes may be affected by a re-radiance amplification effect, in which build material which is untreated by print agents may reflect more energy back towards the energy source than treated build material. As the fusing lamps may comprise a reflector to concentrate the energy towards the build material, this reflected light is re-radiated towards the print bed and results in additional heating. Therefore, the uniformity of the thermal distribution throughout the build bed can be improved when the proportion of build material to be solidified is substantially uniform across the build bed for all layers which are to be selectively fused during manufacture of the object. Thus, for performing this additional validation, the composed layers of the rendered/voxelized object are to be examined.

The additional validation (see block 218 in FIG. 2) could be performed for example during or after the consumption estimation processing at block 216 in FIG. 2, wherein the printing pipeline is executed at a lower resolution. First, information of solid voxels to be printed in a given layer is determined by selecting the objects which intersect with current layer Z and composing the corresponding object slice in the bed layer image. From that image, a density measure can be computed by getting the percentage of solid voxels in the layer image for every column of the image. The solid voxels may be accumulated column by column because this is the direction in which the reflector from the fusing lamp causes the re-radiance amplification effect. Then, if the density has more variability than a certain threshold, a warning could be generated due to object density, and the layer Z having the issue may be identified in a warning message issued to a user. According to an example, some corrective action could be performed in order to adjust the object density in selected layers and to ensure a more uniform density distribution. Thus, part quality issues due to a large variation in object density throughout the layers are spotted before printing commences.

Finally, after validation according to at least one shape criterion has been performed, a warning message may be issued to a user. In case of multiple shape criteria being examined during validation, the results may be consolidated and provided to the user in a single message or via a single user interface.

Additionally, once the job reaches the 'processed' status at block 220, the results of additional validations which have been performed on the rendered/voxelized data e.g. in block 218, can be combined with the previously-obtained validation results obtained at block 208 and provided to the user.

When the user submits the job to print, the consolidated result will be evaluated and if some of the checks fail, information can be displayed with recommendations on how to solve the issues on the job. Then, depending on the application, the print workflow may let the user continue with the printing dismissing the warning messages, or, if it is a production environment, it may prevent the user from printing until he resubmits the job with the issues fixed. According to an example, corrective action, such as e.g. adjusting object distances or reformatting an object with multiple isolated volumes as multiple separate objects, may be performed automatically based on the validation result.

Figure 3:
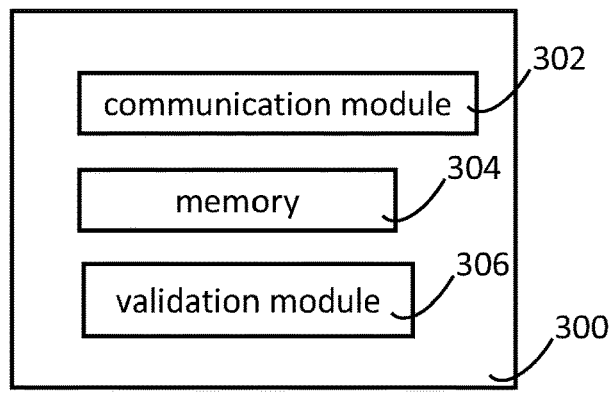
FIG. 3 is a simplified schematic view of a processing device according to one example.

FIG. 3 shows an example for processing circuitry 300 for performing a method as described above. Therein, a communication module 302 may receive 3D mesh model data, which may subsequently be stored in a memory 304. A validation module 306 is provided for performing the validation processing as described above. The result of the validation can then be transmitted via the communication module 302, for example as a warning message to a user. According to an example, the validation module 306 may perform corrective action on the 3D object model data.

Figure 4:
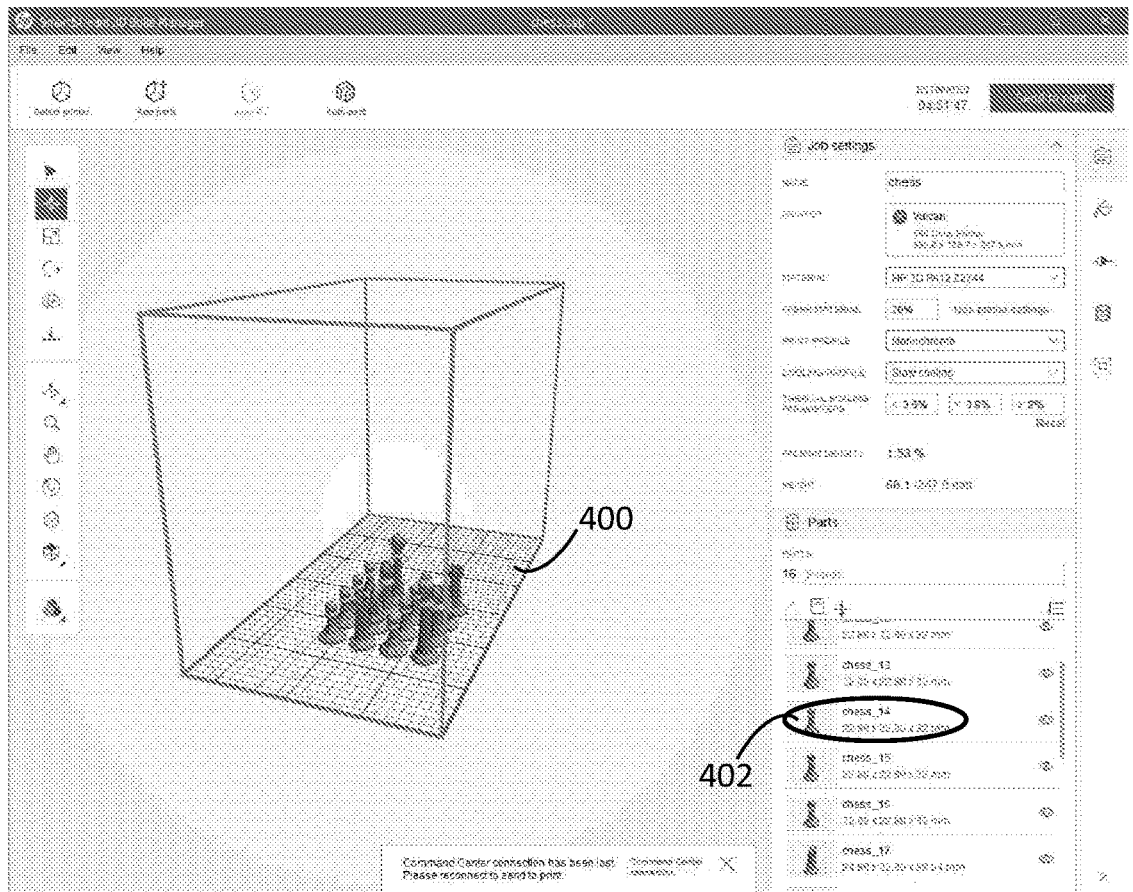
FIG. 4 shows an example of a user interface for generating and amending object model data.

In order to provide detailed information regarding potential part quality issues to the user, according to an example, the 3MF production extension Universally Unique Identifier (UUID) attribute may be used, which identifies every resource inside the 3MF file by a unique ID. Furthermore, the 3MF file also provides a human readable string which can be displayed in a pre-print user interface. FIG. 4 shows an example of 3MF file content which may be displayed in conjunction with a user interface of an additive manufacturing apparatus or of a further device which handles the parsing and 3MF file generation blocks 200 and 202.

As further shown in FIG. 4, a graphical representation 400 of the object to be printed may be provided as part of a user interface for editing 3D object model data. In the example shown in FIG. 4, the object 400 comprises multiple different objects 402, named "chess_13", "chess_14", . . . . Each object 402 is identified by a unique object ID 404, as shown in the excerpt from the corresponding 3MF file. Thus, a list of pairs of objects which violate the minimum object distance criterion may be generated, and/or the references to respective objects in the 3MF file may be highlighted, using the respective unique object IDs 404, enabling the user to identify these objects in the pre-print mesh model. Similarly, a list with the respective unique object IDs 404 of all the objects containing more than one volume could be included in a warning message, or a list with the ranges of Z coordinates of the layers which violate the object density criterion could be displayed.

For all of the examples of validation processing methods and circuitry as described above, respective shape criteria can be selected based on at least one of the properties of the build material and the properties of the additive manufacturing apparatus, in order to provide a material-specific and apparatus-specific validation which ensures that part quality is optimized for a particular additive manufacturing apparatus using a particular build material. Different types and models of additive manufacturing apparatuses may have different limitations, and different materials may have their own set of constraints, which may result in different shape criteria to be used in the validation process.

The validation according to the examples as described above enables an additive manufacturing process which saves time, energy and build material by ensuring early in the printing process that objects that are to be printed conform with specific shape criteria, thus avoiding the printing of jobs with non-optimal configuration.

In case of a negative validation result, an automatic feedback may be provided to the user which enables the user to identify the issues with the current job and recompose it following the specific instructions retrieved. Therein, suggestions may be provided to the user on how to address the potential part quality issues and on how to amend the current job based on the validation results. Such suggestions could, for example, be provided in a pre-print model generation user interface such as the one shown in FIG. 4. According to an example, some issues may be resolved automatically using corrective action based on the validation results.

It is noted that the present manufacturing method is not restricted to a specific additive manufacturing technology, but can be performed on 3D mesh model data Depending on the job attribute, the point where the validation may be performed can be a different point of the print job submission pipeline Examples in the present disclosure can be provided as methods, systems or machine-readable instructions, such as any combination of software, hardware, firmware or the like. Such machine-readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine-readable instructions may, for example, be executed by a general-purpose computer, a special purpose computer, an embedded processor or processors of other programmable data processing devices to realize the functions described in the description and diagrams. In particular, a processor or processing apparatus may execute the machine-readable instructions. Thus, functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine-readable instructions may also be stored in a computer readable storage that can guide the computer or other programmable data processing devices to operate in a specific mode.

Such machine-readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
  receiving, by a processor, a plurality of objects to be additively manufactured by an additive manufacturing apparatus by deposition and selective solidification of a plurality of layers of build material, each object having corresponding 3D mesh model data;
  parsing, by the processor, the plurality of objects to generate a file corresponding to a print job to additively manufacture the plurality of objects within a print job at respective positions of a build bed of the additive manufacturing apparatus, the file specifying the respective position of the build bed at which each object is to be additively manufactured;
  validating, by the processor, whether a minimum distance between each of one or more object pairs satisfies a minimum inter-object distance at which the objects are additively manufacturable by the additive manufacturing apparatus at a specified quality; and
  upon successfully validating that the minimum distance between each object pair satisfies the minimum inter-object distance, rendering, by the processor, the 3D mesh model data of each object and causing the additive manufacturing apparatus to perform the print job using the rendered 3D mesh model data of each object to additively manufacture the objects on the build bed, wherein the 3D mesh model data of each object is not rendered and the print job is not performed, such that the objects are not additively manufactured, unless the minimum distance between each object pair has been successfully validated.

2. The method according to claim 1, wherein the 3D mesh model data of each object comprises either or both of triangle mesh data and polygonal slice data.

3. The method according to claim 1, wherein the minimum inter-object distance is based on the build material to be used in the additive manufacturing apparatus.

4. The method according to claim 1, further comprising:
  identifying, by the processor, one or more composite objects that each encompass a sub-plurality of the objects that are assembled after additive manufacture to form an assembled device,
  wherein each object pair comprises a first object and a second object, each of the first object and the second object being one of the plurality of objects not encompassed by any composite object or one of the composite objects, such that the minimum distance is not validated between any pair of objects encompassed by any composite object.

5. The method according to claim 1, wherein the rendered mesh data of each object comprises a plurality of slices, the method further comprising:
  upon rendering the mesh data of each object, validating whether a variability of a density measure for each slice of the rendered mesh data of each object is less than a threshold corresponding to uniform solidification of the layers of the build material during additive manufacture of the objects by the additive manufacturing apparatus,
  wherein the print job not performed, such that the objects are not additively manufactured, unless the variability of the density measure for each slice of the rendered mesh data of each object has been successfully validated.

6. A system comprising:
  a processor; and
  a memory storing program code executable by the processor to:
  receive a plurality of objects to be additively manufactured by an additive manufacturing apparatus by deposition and selective solidification of a plurality of layers of build material, each object having corresponding 3D mesh model data;
  parse the plurality of objects to generate a file corresponding to a print job to additively manufacture the plurality of objects within a print job at respective positions of a build bed of the additive manufacturing apparatus, the file specifying the respective position of the build bed at which each object is to be additively manufactured;
  validate whether a minimum distance between each of one or more object pairs satisfies a minimum inter-object distance at which the objects are additively manufacturable by the additive manufacturing apparatus at a specified quality; and
  upon successfully validating that the minimum distance between each object pair satisfies the minimum inter-object distance, render the 3D mesh model data of each object and cause the additive manufacturing apparatus to perform the print job using the rendered 3D mesh model data of each object to additively manufacture the objects on the build bed, wherein the 3D mesh model data of each object is not rendered and the print job is not performed, such that the objects are not additively manufactured, unless the minimum distance between each object pair has been successfully validated.

7. The system according to claim 6, wherein the 3D mesh model data of each object comprises either or both of triangle mesh data and polygonal slice data.

8. The system according to claim 6, wherein the minimum inter-object distance is based on the build material to be used in the additive manufacturing apparatus.

9. The system according to claim 6, wherein the program code is executable by the processor to further:
Identify one or more composite objects that each encompass a sub-plurality of the objects that are assembled after additive manufacture to form an assembled device,
wherein each object pair comprises a first object and a second object, each of the first object and the second object being one of the plurality of objects not encompassed by any composite object or one of the composite objects, such that the minimum distance is not validated between any pair of objects encompassed by any composite object.

10. The system according to claim 6, wherein the rendered mesh data of each object comprises a plurality of slices, and the program code is executable by the processor to further:
upon rendering the mesh data of each object, validate whether a variability of a density measure for each slice of the rendered mesh data of each object is less than a threshold corresponding to uniform solidification of the layers of the build material during additive manufacture of the objects by the additive manufacturing apparatus,
wherein the print job not performed, such that the objects are not additively manufactured, unless the variability of the density measure for each slice of the rendered mesh data of each object has been successfully validated.

11. The system according to claim 6, further comprising the additive manufacturing apparatus.

12. The system according to claim 6, wherein the processor and the memory are part of a device separate from the additive manufacturing apparatus.

13. A non-transitory machine-readable medium storing program code executable by a processor to perform processing comprising:
receiving a plurality of objects to be additively manufactured by an additive manufacturing apparatus by deposition and selective solidification of a plurality of layers of build material, each object having corresponding 3D mesh model data;
parsing the plurality of objects to generate a file corresponding to a print job to additively manufacture the plurality of objects within a print job at respective positions of a build bed of the additive manufacturing apparatus, the file specifying the respective position of the build bed at which each object is to be additively manufactured;
validating whether a minimum distance between each of one or more object pairs satisfies a minimum inter-object distance at which the objects are additively manufacturable by the additive manufacturing apparatus at a specified quality; and
upon successfully validating that the minimum distance between each object pair satisfies the minimum inter-object distance, rendering the 3D mesh model data of each object and causing the additive manufacturing apparatus to perform the print job using the rendered 3D mesh model data of each object to additively manufacture the objects on the build bed,
wherein the 3D mesh model data of each object is not rendered and the print job is not performed, such that the objects are not additively manufactured, unless the minimum distance between each object pair has been successfully validated.

14. The non-transitory machine-readable medium according to claim 13, wherein the 3D mesh model data of each object comprises either or both of triangle mesh data and polygonal slice data.

15. The non-transitory machine-readable medium according to claim 13, wherein the minimum inter-object distance is based on the build material to be used in the additive manufacturing apparatus.

16. The non-transitory machine-readable medium according to claim 13, wherein the processing further comprises:
identifying one or more composite objects that each encompass a sub-plurality of the objects that are assembled after additive manufacture to form an assembled device,
wherein each object pair comprises a first object and a second object, each of the first object and the second object being one of the plurality of objects not encompassed by any composite object or one of the composite objects, such that the minimum distance is not validated between any pair of objects encompassed by any composite object.

17. The non-transitory machine-readable medium according to claim 13, wherein the rendered mesh data of each object comprises a plurality of slices, the processing further comprising:
upon rendering the mesh data of each object, validating whether a variability of a density measure for each slice of the rendered mesh data of each object is less than a threshold corresponding to uniform solidification of the layers of the build material during additive manufacture of the objects by the additive manufacturing apparatus,
wherein the print job not performed, such that the objects are not additively manufactured, unless the variability of the density measure for each slice of the rendered mesh data of each object has been successfully validated.

* * * * *